(12) United States Patent
Freber

(10) Patent No.: US 6,384,989 B1
(45) Date of Patent: May 7, 2002

(54) OPTICAL SYSTEM

(76) Inventor: Werner Freber, Höhenweg 26, D-61184 Karben (DE)

( * ) Notice: Subject to any disclaimer, the term of this patent is extended or adjusted under 35 U.S.C. 154(b) by 0 days.

(21) Appl. No.: 09/713,623

(22) Filed: Nov. 15, 2000

(30) Foreign Application Priority Data

Jan. 28, 2000 (DE) .......................................... 100 03 789

(51) Int. Cl.⁷ .......................... G02B 27/02; G02B 3/00; G02B 5/02
(52) U.S. Cl. ...................... 359/799; 359/809; 359/599
(58) Field of Search .................................. 359/799, 800, 359/801, 802, 804, 809, 387, 389, 599; 362/246

(56) References Cited

U.S. PATENT DOCUMENTS

| | | | |
|---|---|---|---|
| 5,267,087 A | * 11/1993 | Wiedermann | 359/801 |
| 5,752,767 A | * 5/1998 | Muehlemann | 362/277 |
| 5,781,338 A | * 7/1998 | Kapitza et al. | 359/398 |

FOREIGN PATENT DOCUMENTS

| | | | |
|---|---|---|---|
| DE | 37 34 691 | 4/1988 | G02B/21/06 |
| DE | 197 48 211 | 5/1999 | G02B/23/12 |
| EP | 0 504 940 | 9/1992 | G02B/21/06 |

* cited by examiner

*Primary Examiner*—Georgia Epps
*Assistant Examiner*—Saeed H Seyrafi
(74) *Attorney, Agent, or Firm*—Collard & Roe, P.C.

(57) ABSTRACT

To image the surface, provided with an analysis preparation, of the bottom of a well of a microtiter plate (16) made of a transparent material, provision is made for an optical system with a magnifying objective and an incident-light illumination formed by an annular, diffuse light source (15) which is arranged concentrically with the optical axis (19). The microtiter plate (16) has its rear side illuminated by an approximately point-shaped light source (17) arranged behind a diffuser disk (18) and located centrally relative to the optical axis (19). Reflections and material interferences occurring in the area lying outside the measurement surface subject to evaluation are thereby rendered invisible.

3 Claims, 2 Drawing Sheets

OPTICAL SYSTEM

This invention relates to an optical system with a magnifying objective and an incident-light illumination which is intended to image the surface, provided with an analysis preparation, of the bottom of a well of a microtiter plate made of a transparent material.

BACKGROUND OF THE INVENTION

Optical systems of the type referred to are utilized in particular for the evaluation of ELISPOT (Enzyme Linked Immuno Spot) assays. This method has been devised for identifying beta cells secreting individual antibodies. It finds application also in the identification of cytokine secretions of special subgroups of leukocytes or T-lymphocytes from peripheral blood as well as of monocytes and granulocytes. In the ELISPOT method proteins secreted from the cells are identified with antibodies, and point-shaped stains referred to as spots are produced by means of special coloring methods, which spots are permanent and suitable for evaluation, both visually and by means of image analysis. In laboratory routine, ELISPOT assays are typically performed using microtiter plates (MTP), also commercially designated as filter plates or multiscreen plates. The microliter plates comprise small interlinked cups also referred to as cavities or wells. The bottom of the cups is conventionally formed by a filter membrane to which the point-shaped objects subject to the assay adhere. A standard size MTP comprises 96 wells.

To evaluate an ELISPOT assay it is necessary to count the small spots of up to 1,500 per well which are visible on the bottom of the wells of an MTP, the bottom providing the measurement surface. To this effect, automatically operating evaluating devices are used which image the surface of the bottom of the individual wells with an about twenty- to fortyfold magnification, take the images with an electronic camera, and evaluate the digitized image data by means of an electronic computer.

The processes of imaging and evaluating the microtiter plates present the problem that reflection outside the filter membrane produces a phantom image of the filter membrane, so that the spots occurring in the marginal area are detected twice, causing errors to be introduced in the measurement process. To prevent this from happening, one possibility would include masking the areas lying outside the well with a circular mask. This would however necessitate an exact positioning of the individual wells of the microtiter plate relative to the optical axis, which is a highly complex and difficult task considering that the microtiter plate manufacturers do not guarantee an absolutely accurate positioning of the filter membranes and the adjustment accuracy of an X-Y table necessary for positioning would have to lie in the range of 2 $\mu$m, approximately. To solve this problem, one proposal hitherto made includes detaching the filter membranes from the MTP, adhering them to a film and then optically detecting and evaluating the adhered filter membranes. Separating the filter membranes from the MTP prevents the generation of a phantom image by reflection. The disadvantages of this approach are however that the processes of detaching and adhering require an additional operation, that individual membranes may shift out of place as the filter membranes are detached, and that the film materials service life is limited. On the other hand, recent image analytical devices provide an easy way to determine the position of the adhered filter membranes and to cause an X-Y table to travel to the center of the image, if and when necessary.

In another known system of the type referred to, the positioning of the magnifying objective initially involves detecting the MTP from a major distance without appreciable magnification and then using this image for measuring and storing the exact position of the individual wells. By means of the stored values it is then possible to position the magnifying objective above the individual wells automatically. This necessitates a relatively high construction effort for the optical system and the positioning table, and additional memory capacity is needed for storing the position-related data.

SUMMARY OF THE INVENTION

It is an object of the present invention to provide an optical system of the type initially referred to which enables the measurement surfaces of a transparent MTP to be imaged without the occurrence of reflections interfering with the image evaluation.

According to the present invention, this object is accomplished in that the incident-light illumination is formed by an annular diffuse light source arranged concentrically with the optical axis, and that on the rear side of the microtiter plate provision is made for a powerful, approximately point-shaped light source which is located centrally relative to the optical axis.

By virtue of the illumination according to the invention the MTP area lying outside the measurement surface of the filter membrane is imaged completely white. By contrast, the prepared measurement surface is set off against this light background in a lightly gray color. Reflections and material interferences in the area lying outside the measurement surface needing to be evaluated are no longer visible. This effect can be further enhanced by arranging the approximately point-shaped light source behind a diffuser disk, thus accentuating the contrast between measurement surface and background.

The optical system of the present invention has the advantage of enabling fault-free imaging and evaluation of the measurement surfaces of an MTP's filter membranes. Even minor inaccuracies in locating the measurement surface centrally to the optical axis will not impair the accuracy of measurement so that the demands placed on the positioning accuracy of the table carrying the MTP and movable in the X and Y direction may be less high, accordingly enabling the table to be manufactured more economically. The distinct contrast of the measurement surfaces from the light background surrounding them furthermore makes it possible to determine the position of the measurement surfaces by means of image analysis and to move them automatically to the image center under appropriate table control. An automatic evaluation of microtiter plates is hence readily possible.

The present invention will be described in more detail in the following with reference to an embodiment illustrated in the accompanying drawings. In the drawings,

DETAILED DESCRIPTION OF THE INVENTION

Figure 1:
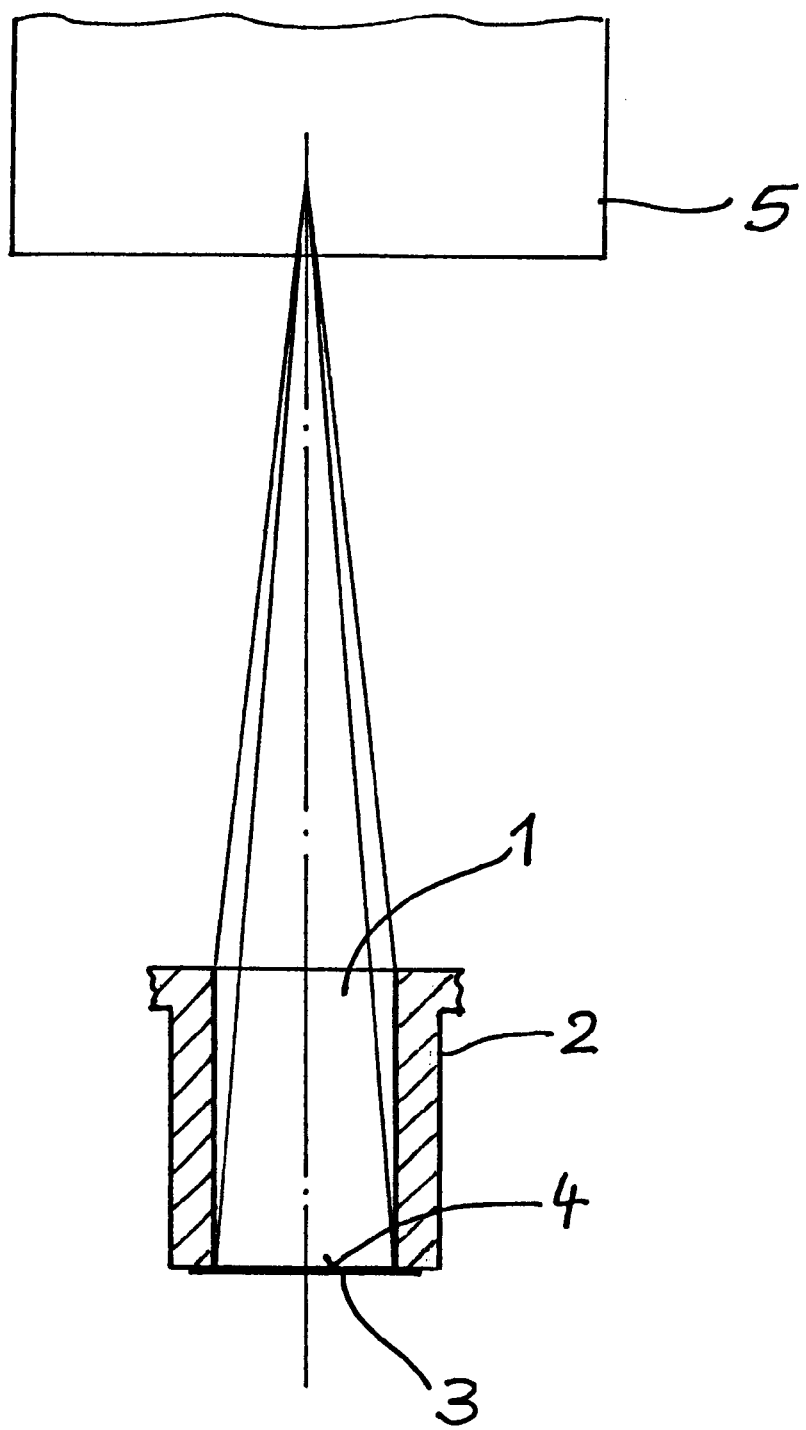
FIG. 1 is a cross-sectional view of the well of an MTP, illustrating the imaging beam path of an objective.

Referring now to FIG. 1, there is shown in cross section a well 1 of a commercial microtiter plate as used for ELISPOT assays. The well 1 is comprised of a cylindrical tube 2 fabricated from a transparent plastics material. The tube 2 has its lower opening closed by a filter membrane 3 which is secured to the tube 2 by an adhesive and forms the bottom of the well 1. The surface of the filter membrane 3 on the side close to the hollow interior of the well 1 provides the measurement surface 4 to which the point-shaped objects subject to the assay adhere.

To evaluate an ELISPOT assay, provision is made for an optical system 5 which produces a magnified image of the measurement surface 4 which is then taken by an electronic camera for processing by means of image analysis. The beam path shown in FIG. 1 illustrates the areas of the well 1 imaged by the optical system 5. As will be understood, apart from the measurement surface 4 also the cylindrical wall of the well 1 will be imaged as a ring surrounding the image of the measurement surface 4. As a result, reflections of the measurement surface 4 on the cylindrical wall of the well 1 may also be imaged, which involves the risk of errors being introduced in the evaluation because of the difficulty to distinguish them from the image of the measurement surface 4.

Figure 2:
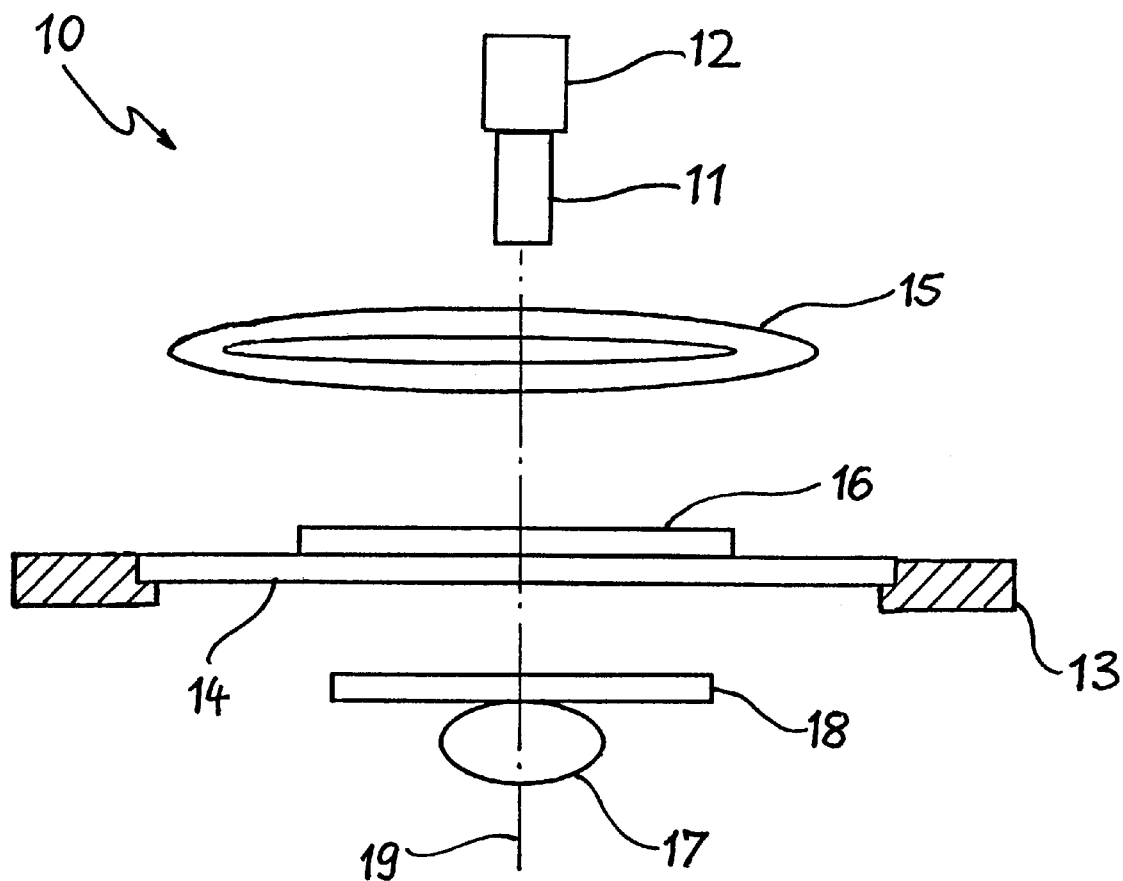
FIG. 2 is a schematic view of the optical system of the present invention.

FIG. 2 shows the architecture of an optical system 10 of the present invention by means of which it is possible to prevent imaging of a well's wall area surrounding the measurement surface. The optical system 10 comprises a magnifying objective 11 with a camera 12 arranged above a transparent supporting plate 14 mounted on a table 13 traversable in X and Y direction. Further disposed above the table 13 is a ring lamp 15 as, for example, an LED diffuser lamp, which illuminates the microtiter plate 16 arranged on the supporting plate 14 from above. Arranged underneath the supporting plate 14 of the table 13 is a point-shaped lamp 17 with a diffuser disk 18. The lamp 17 may be formed by several light-emitting diodes arranged in close proximity to each other. Both lamps, the ring lamp 15 and the lamp 17, are located centrally to the optical axis 19 of the objective 11. The density of light of the lamp 17 is significantly higher than that of the ring lamp 15.

What is claimed is:

1. An optical system comprising a magnifying objective and an incident-light illumination source which is intended to image a top surface, provided with an analysis preparation, of the bottom of a well of a microtiter plate made of a transparent material, wherein said incident-light illumination source is formed by an annular diffused light source (15) arranged concentrically with the optical axis (19) of the system, and on the rear side of the microtiter plate (16) a powerful, approximately point-shaped light source (17) is provided, which is located centrally relative to said system optical axis (19).

2. The optical system as claimed in claim 1, wherein the powerful, approximately point-shaped light source (17) is arranged behind a diffuser disk (18).

3. The optical system as claimed in claim 1, wherein the powerful, approximately point-shaped light source (17) has a light density exceeding that of the annular diffuse light source (15).

* * * * *